United States Patent [19]

Sasa et al.

[11] Patent Number: 5,042,152
[45] Date of Patent: Aug. 27, 1991

[54] METHOD OF MANUFACTURING A SOCKET OF A TUBE COUPLER

[75] Inventors: Takeya Sasa; Yoshikazu Kobayashi, both of Tokyo, Japan

[73] Assignee: Nitto Kohki Co., Ltd., Tokyo, Japan

[21] Appl. No.: 569,448

[22] Filed: Aug. 20, 1990

[30] Foreign Application Priority Data

Sep. 4, 1989 [JP] Japan .................. 1-228964

[51] Int. Cl.⁵ .............................. B23P 19/04
[52] U.S. Cl. .................. 29/890.144; 29/434; 29/443; 72/51
[58] Field of Search .................. 29/434, 443, 451, 521, 29/890.14, 890.141, 890.144, 890.145, 890.15, DIG. 32; 72/51, 368; 285/91, 316, 318, 319, 249, 250

[56] References Cited

U.S. PATENT DOCUMENTS

| | | | |
|---|---|---|---|
| 2,675,774 | 4/1954 | Bergan | 72/368 X |
| 4,628,720 | 12/1986 | Tani et al. | 72/51 X |
| 4,875,720 | 10/1989 | Sasa et al. | 285/249 |
| 4,904,001 | 2/1990 | Sasa et al. | 285/316 |
| 4,904,002 | 2/1990 | Sasa et al. | 285/316 |
| 4,907,830 | 3/1990 | Sasa et al. | 285/91 |

FOREIGN PATENT DOCUMENTS 24922  2/1985  Japan ....................... 72/51

Primary Examiner—Joseph M. Gorski
Assistant Examiner—Peter Dungba Vo
Attorney, Agent, or Firm—Nixon & Vanderhye

[57] ABSTRACT

A socket of a tube coupler is manufactured in the following steps: A rectangular steel plate is formed with pin-guiding lock grooves which are arranged at equal longitudinal intervals after the plate has been wound. The plate is wound as a single layer along the longitudinal direction thereof to form a tubular body. When the tubular body is used as a connector between a socket main cylinder and a socket adapter and when the socket adapter is fitted closely in one end portion of the tubular body, the other end portion of the tubular body is fixedly fitted in the free end portion of the socket adapter. Thereafter, the pins are fixed to the outer periphery of the socket main cylinder, through the respective lock grooves, so that a socket is manufactured. When, on the other hand, the tubular member is used as a socket main cylinder, the lock grooves are formed so that one end of each thereof opens at one end of the socket main cylinder, and a socket adapter is connected to the other end of the socket main cylinder to form a socket. A plug having the pins is guided by the lock grooves to be inserted into the socket.

6 Claims, 4 Drawing Sheets

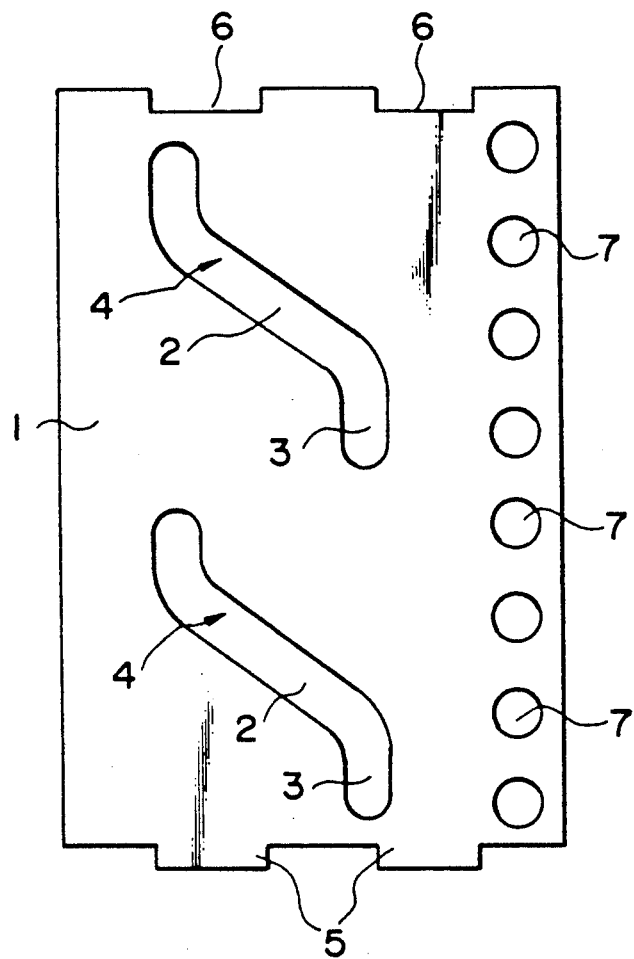
F I G. 1
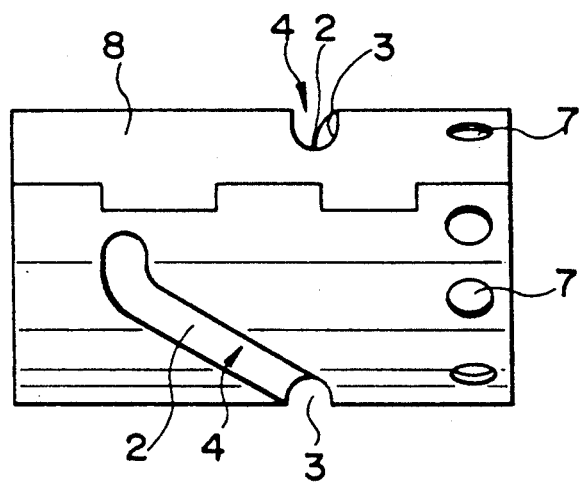
F I G. 2

METHOD OF MANUFACTURING A SOCKET OF A TUBE COUPLER

BACKGROUND OF THE INVENTION

1. Field of the Invention

This invention relates to a method of manufacturing a socket of a tube coupler for connecting thereto a plug or a corrugated tube as a connected member by making a relative rotation between the tube coupler and the connected member.

2. Description of the Related Art

The socket of a conventional tube coupler which has a relatively simple structure and easily operable locking means comprises a tubular body projecting from a socket adapter and having lock grooves each consisting of an elongated hole in an inclined relation with the axis of the tubular body and a secondary hole extending axially of the tubular body from one end of the elongated hole, and pins fixed to the socket main cylinder through the lock grooves.

The socket of another conventional tube coupler comprises a tubular body constituting a socket main cylinder projecting from a socket adapter, and lock grooves each consisting of a first hole extending along the axis of the tubular body and opened at the forward end of the tubular body, a second hole continuous to the first hole and extending slantwise of the axis of the tubular body and a third hole continuous to the second hole and extending in the circumferential direction of the tubular body. The pins fixed to the outer periphery of a plug are made to engage the corresponding lock grooves, thereby to insert the plug in the socket main cylinder.

U.S. Pat. Nos. 4,875,720; 4,904,002; 4,907,830; and 4,904,001 disclose further similar tube couplers.

The tubular bodies used in the above-mentioned tube couplers are manufactured from hollow cylindrical tubes. Therefore, the lock grooves must be formed only by cutting. The cutting process, however, has a drawback that it is very time-consuming.

SUMMARY OF THE INVENTION

The object of this invention is to provide a method of manufacturing a socket of a tube coupler which is easily manufactured.

According to one aspect of this invention, the method of manufacturing a socket of a tube coupler comprises the steps of forming, in a rectangular plate having a longitudinal direction and a crosswise direction perpendicular thereto, at equal intervals in the longitudinal direction, lock grooves each comprising an inclined elongated hole having two ends and intersecting at a predetermined angle with the longitudinal direction and a short hole formed continuous with the inclined elongated hole at one of the two ends thereof and extending in the longitudinal direction, winding the plate as a single layer to form a tubular body, fixing the tubular body to a socket adapter having a fluid passageway formed axially therethrough so as for the tubular body to be coaxial with the passageway, rotatably inserting into the socket adapter, through a seal ring, a socket main cylinder having formed therethrough a passageway with a diameter substantially equal to that of the passageway of the socket adapter, and fixing a pin to the socket main cylinder such that it passes through a respective one of the lock grooves.

According to another aspect of this invention, the method of manufacturing a socket of a tube coupler comprises the steps of forming, in a rectangular plate having two lateral sides, a longitudinal direction and a crosswise direction perpendicular thereto, lock grooves each comprising an inclined elongated hole having two ends and intersecting at a predetermined angle with the longitudinal direction, a long crosswise hole extending from one of the two ends of the longitudinal elongated hole to one of the two lateral sides of the plate so as to have an opening at the one of the lateral sides of the plate and a short longitudinal hole extending from the other end of the inclined elongated hole in the longitudinal direction, winding the plate as a single layer into a cylinder body constituting a socket main cylinder, and attaching the socket main cylinder to a socket adapter having a passageway formed axially therethrough at the one of the two lateral sides of the plate which has been wound such that the socket main cylinder is coaxial with the passageway of the socket adapter.

According to this invention, lock grooves are formed in a rectangular plate by means of a press operation, and thereafter the plate is wound as a single layer to form a tubular body. This process enables the lock grooves to be instantaneously formed. As a result, the lock grooves are easily formed at low cost and in a short time without the need to employ a costly, time-consuming cutting operation.

BRIEF DESCRIPTION OF THE DRAWINGS

This invention can be fully understood from the following detailed description with reference to the accompanying drawings in which:

FIG. 1 is a plan view of a plate manufactured by means of a press operation according to a first embodiment of the manufacturing method of this invention;

FIG. 2 is a side elevational view of a tubular body formed by means of the winding step of the first embodiment of the manufacturing method of this invention;

DETAILED DESCRIPTION OF THE PREFERRED EMBODIMENTS

Figure 3:
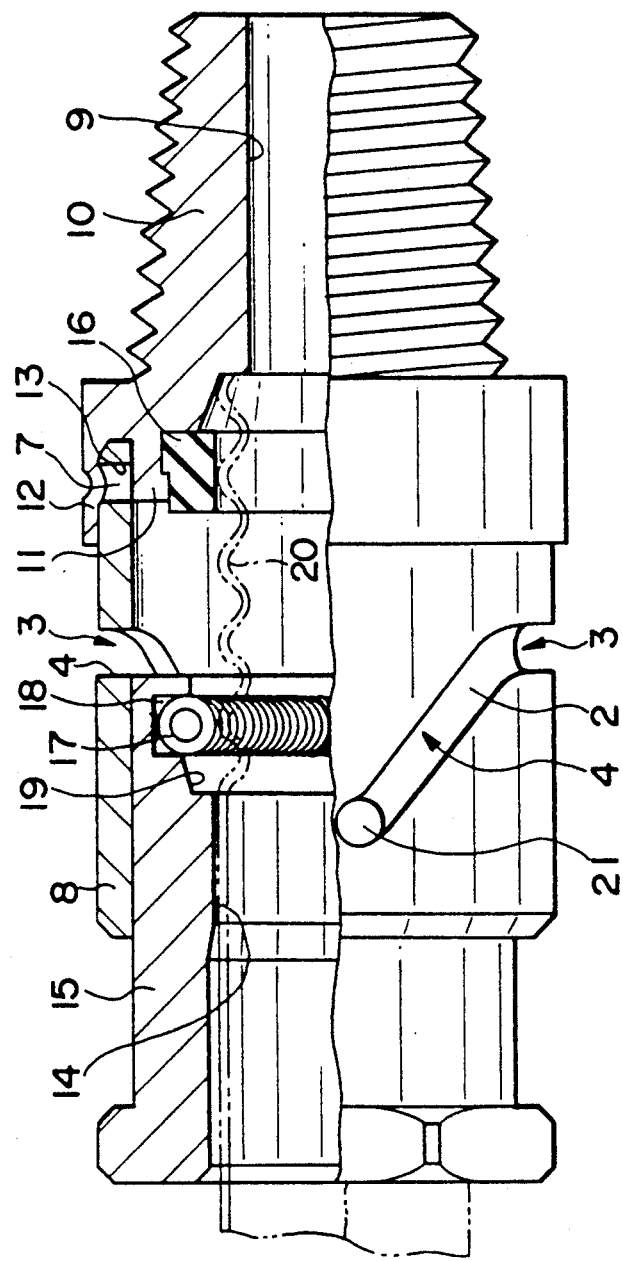
FIG. 3 is a partially cut-away side elevational view of a completed socket manufactured by means of the first embodiment of the manufacturing method of the present invention.

A first embodiment of this invention will now be explained with reference to FIGS. 1 to 3.

In the first step, as shown in FIG. 1, lock grooves 4 are formed in a rectangular steel plate 1 which is cut from a steel sheet material so as to have a longitudinal dimension (length) equal to the circumferential length of a socket main cylinder 15 to be manufactured, and a crosswise dimension (width) equal to the axial length of the socket main cylinder 15. Each lock groove 4 is press-formed and comprises an inclined elongated hole 2 intersecting with the longitudinal direction of the plate 1 and a short hole 3 extending longitudinal of one end of the inclined elongated hole 1. The width of the groove 4 coincides with the outer diameter of a later-described pin 21.

As shown in FIG. 1, projections 5 are formed on one end of the plate 1 and depressions 6 corresponding to the projections 5 are formed in the other end thereof. Further, a plurality of circular holes 7 are formed at equal intervals along and in one of the lateral side portions of the plate 1. The projections 5, the depressions 6 and the circular holes 7 are press-formed at the same time of the formation of the lock grooves 4.

In the second step, the plate 1 as shown in FIG. 1 is wound in a cylindrical form. Both ends of the plate 1 are rendered abutted against each other so as to engage the projections 5 with the respective depressions 6, thereby to form a single-layered tubular body 8 (see FIG. 2).

The tubular body 8 is instantaneously formed and is as good as regards its structure strength and function as the one formed from a cylindrical member.

In the third step, as shown in FIG. 3, the tubular body 8 is, under pressure, inserted into a tubular portion 12 formed at the open free end of a socket adapter 10 manufactured separately from the tubular body 8 and having a passageway (fluid passage) 9, so as to be coaxial therewith. An annular groove 13 having a groove width slightly less than the thickness of the steel plate 1 has previously been formed in the tubular portion 12 of the socket adapter 10. The tubular body 8 is closely fitted in the tubular portion 12 so that the holes 7 of the tubular body 8 are disposed close to the annular groove 13 of the socket adapter 10, and thereafter the tubular portion 12 is caulked at the holes 7 to engage them. Thus, the tubular body 8 is fixed firmly to the socket adapter 10.

In the fourth step, a socket main cylinder 15 having a passageway (fluid passage) 14 of substantially the same diameter as that of the passageway 9 of the socket adapter 10 and manufactured separately from the tubular body 8 and the socket adapter 10 is slidably fitted, by rotation, in the tubular body 8 to which the socket adapter 10 is fixed. Fitted in the tubular portion 12 of the socket adapter 10 is a seal ring 16 having an inner diameter less than the diameter of the passageway 14 of the socket adapter 10. In that end portion of the passageway 14 of the socket main cylinder 15 which is close to the socket adapter 10 is formed an annular groove 18 having a tapered portion 19. A rigid locking coil ring 17 having a relatively large wire diameter is fitted in the annular groove 18, so as to be reduced in diameter by being pressed by the taper portion 19. When a corrugated tube 20 is inserted in the tubular portion 12, the corrugated tube 20 is sealed at its front end portion by the seal ring 16 and is engaged, at the rear end of its corrugated portion, with the coil ring 17 so as to be locked to the socket main cylinder 15.

In the fifth step, pins 21 are fixed to or embedded in the socket main cylinder 15 fitted in the socket adapter 10 by passing through the respective lock grooves 4. By way of the fourth and fifth steps, the socket main cylinder 15 and the socket adapter 10 are rotatably connected to each other.

When the socket main cylinder 15 is rotated with respect to the tubular body 8, so that the pin 21 is moved downward in FIG. 3, the socket main cylinder 15 is moved rightward, thereby to firmly connect the corrugated tube 20 to the socket adapter 10.

Thus, in the case of the first embodiment, a socket which effects a quick connection of a corrugated tube can be manufactured at very low cost.

A second embodiment of this invention will now be explained with reference to FIGS. 4 to 7.

Figure 4:
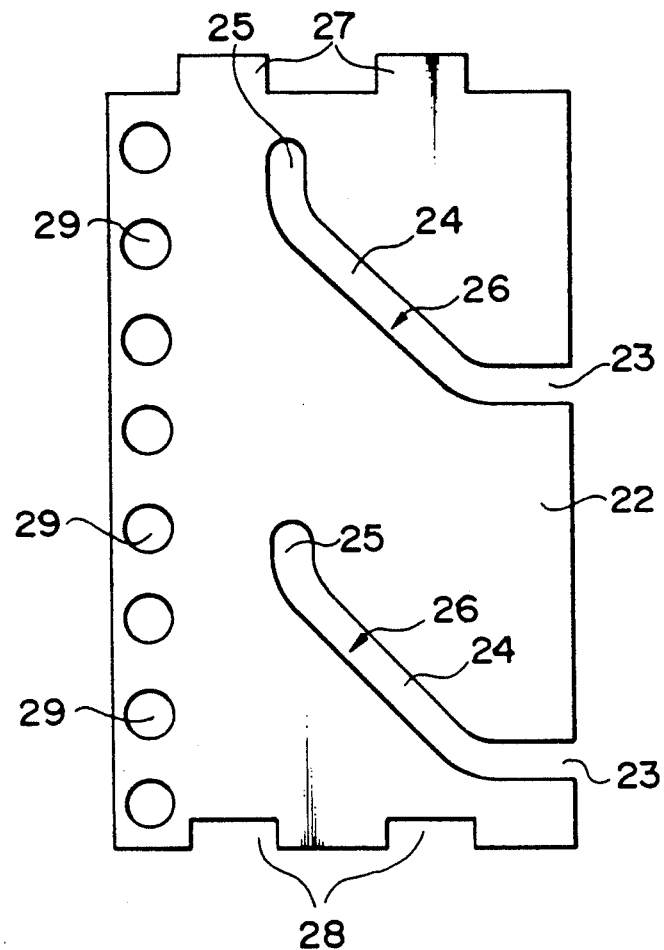
FIG. 4 is a plan view of a plate manufactured by means of a press operation according to a second embodiment of the manufacturing method of this invention.

The first step of the second embodiment, as shown in FIG. 4, is substantially similar to the first step of the first embodiment. A rectangular steel plate 22 is formed by means of a press operation, having two lock grooves 26, which are situated directly opposite each other after the plate 22 has been wound. Each lock groove 26 comprises an inclined elongated hole 24 intersecting with the longitudinal direction of the plate 22 at a predetermined angle, a long hole 23 extending perpendicular to the longitudinal direction of the plate 22, from one end of the inclined elongated hole 24 to the corresponding lateral side of the plate 22, so as to open thereat, and a short hole 25 extending in the longitudinal direction from the other end of the inclined elongated hole 24. The lock grooves 26 do not always penetrate the outer or inner surface of the plate 22.

Projections 27 and depressions 28 are formed at the respective ends of the plate 22, and round holes 29 are formed along and in one lateral side portion of the plate 22, in a similar manner to those of the plate 1 in the first embodiment.

Figure 5:
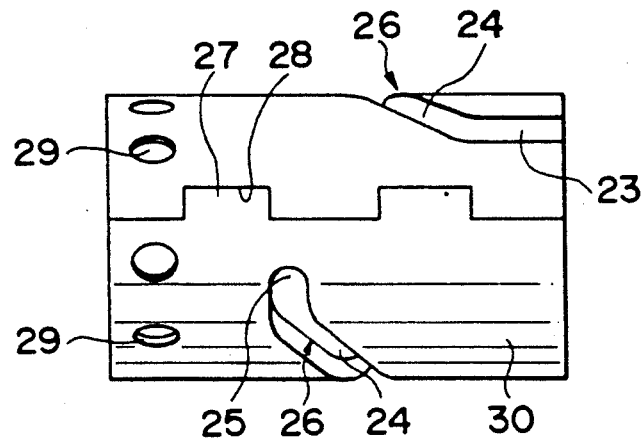
FIG. 5 is a side elevational view of a socket main cylinder formed by means of the winding step of the second embodiment of the manufacturing method of this invention.
Figure 6:
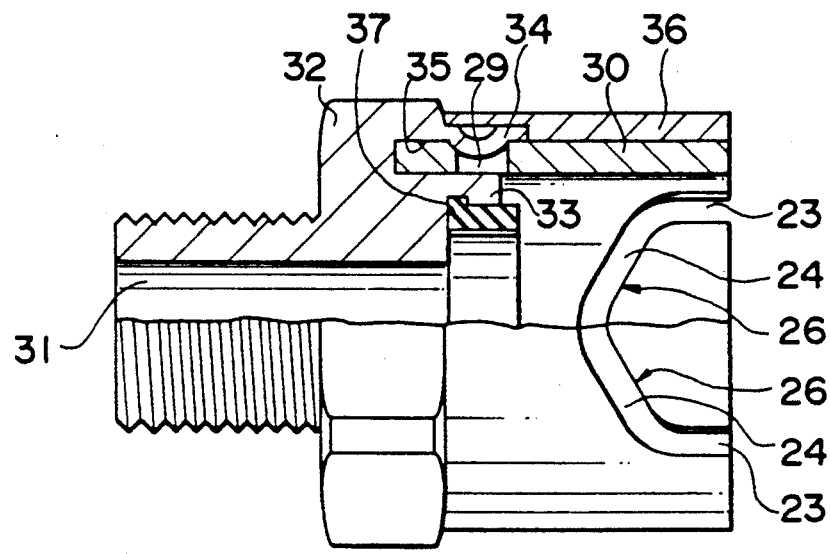
FIG. 6 is a partial cut-away elevational view of a completed socket manufactured by means of the first embodiment of the manufacturing method of this invention.

In the second step which is similar to the second step in the first embodiment, and shown in FIG. 5, the plate 22 is wound as a single layer and is made to engage the projections 27 with the corresponding depressions 28, thereby to form a socket main cylinder 30.

Figure 7:
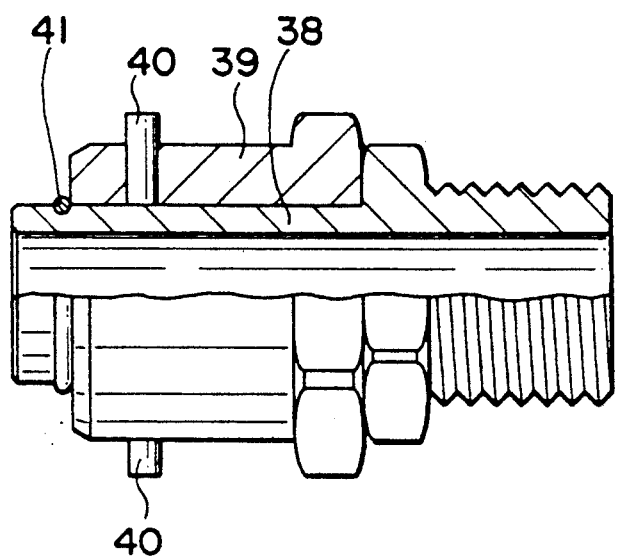
FIG. 7 is a partially cut-away side elevational view of a plug connected to the socket of FIG. 6.

The socket main cylinder 30 has substantially the same inner diameter as the outer diameter of a collar 39 rotatably fitted over the outer periphery of a plug 38 prepared separately from the socket main cylinder 30 (FIG. 7).

In the third step, as shown in FIG. 5, the end portion of the socket main cylinder 30 at which the lock grooves 26 do not open is coaxially inserted, under pressure, into the open free cylindrical end of a socket adapter 32. An annular groove 35 is defined between an inner tubular portion 33 and an outer tubular portion 34 formed in the open free end part of the socket adapter 32 to which the socket main cylinder 30 is fixed under pressure. The outer tubular portion 34 is caulked for engagement with the round holes 29 formed in the socket main cylinder 30, so that the socket main cylinder 30 is connected to the socket adapter 32.

The socket main cylinder 30 itself is fitted in a socket protecting tube 36.

Provided on the inner wall of the inner tubular portion 33 is a ring packing 37 for sealing the front end portion of a plug 38 (see FIG. 7).

FIG. 7 shows a plug 38 which is connected to the socket manufactured according to the second embodiment of this invention. A collar 39 is rotatably fitted onto the outer periphery of the plug 38 to which pins 40 are fixed or in which they are embedded, so as to engage the respective lock grooves 26 formed in the socket main cylinder 30. As the pins 40 are moved along the lock grooves 29 by the relative movement between the socket and the plug 30, the socket is moved axially with respect to the plug 38. A set ring 41 for preventing the collar 39 from being removed from the plug 38 is provided in the outer periphery of the plug 38, so that the inner front end edge of the collar is abutted against the set ring 41.

What is claimed is:

1. A method of manufacturing a socket of a tube coupler comprising the steps of:

forming, in a rectangular plate contained solely within a plane and having a longitudinal direction and a crosswise direction perpendicular thereto, at equal intervals in said longitudinal direction, lock grooves wholly within said plane, each comprising an inclined elongated hole having two ends and intersecting at a predetermined angle with said longitudinal direction, and a short hole formed continuously with said inclined elongated hole, at one end of said two ends thereof, and extending in said longitudinal direction;

winding said plate as a single layer thereby forming a tubular body;

fixing said tubular body to a socket adapter having a fluid passageway formed axially therethrough and a seal ring, such that said tubular body is coaxial with said fluid passageway;

rotatably inserting, from an end of said tubular body remote from said short hole of each of said lock grooves into said socket adapter and into engagement with the seal ring thereof, a socket main cylinder having formed therethrough a passageway with a diameter substantially equal to a diameter of said passageway of said socket adapter; and fixing a pin to said socket main cylinder, such that the pin passes through said short hole of a respective one of said lock grooves after said socket main cylinder has been fully inserted in said socket adapter.

2. The method according to claim 1, wherein said plate has two longitudinal ends, projections formed on one of said longitudinal ends and depressions formed in the other longitudinal end and arranged to be engaged with the corresponding projections.

3. The method according to claim 1, wherein said plate has a lateral side portion, and a plurality of circular holes for engaging said socket adapter, said circular holes being formed along and in said lateral side portion.

4. A method of manufacturing a socket of a tube coupler coupled to a plug, comprising the steps of:

forming, in a rectangular plate having two lateral sides, a longitudinal direction and a crosswise direction perpendicular thereto, lock grooves each comprising an inclined elongated hole having two ends and intersecting at a predetermined angle with said longitudinal direction, a long crosswise hole extending from one of said two ends of said longitudinal elongated hole to one of said two lateral sides of said plate, so as to have an opening at said one of said lateral sides of said plate, and a short longitudinal hole extending from the other end of said inclined elongated hole, in said longitudinal direction;

inserting the plug into said socket, guiding pins formed on said plug engaging initially with said long crosswise holes and subsequently with said inclined elongated holes and finally with said short longitudinal holes of respective lock grooves;

winding said plate as a single layer into a cylinder body constituting a socket main cylinder; and attaching said socket main cylinder to a socket adapter having a passageway formed axially therethrough at said one of said two lateral sides of said plate which has been wound such that said socket main cylinder is coaxial with said passageway of said socket adapter.

5. The method according to claim 4, wherein said plate has two longitudinal ends, projections formed on one of said longitudinal ends and depressions formed in the other longitudinal end and arranged to be engaged with the corresponding projections.

6. The method according to claim 4, wherein said plate has a plurality of circular holes for engaging said socket main cylinder, said circular holes being formed along and in one of said lateral sides.

* * * * *